(12) United States Patent
Bourc'His

(10) Patent No.: US 7,270,619 B2
(45) Date of Patent: Sep. 18, 2007

(54) LINEAR BELT ACTUATOR

(75) Inventor: Joël Bourc'His, Dieppe (FR)

(73) Assignee: Serapid France, Londinieres (FR)

( * ) Notice: Subject to any disclaimer, the term of this patent is extended or adjusted under 35 U.S.C. 154(b) by 187 days.

(21) Appl. No.: 10/481,870

(22) PCT Filed: Jun. 26, 2002

(86) PCT No.: PCT/FR02/02211

§ 371 (c)(1),
(2), (4) Date: Jun. 7, 2004

(87) PCT Pub. No.: WO03/002892

PCT Pub. Date: Jan. 9, 2003

(65) Prior Publication Data

US 2004/0220004 A1 Nov. 4, 2004

(30) Foreign Application Priority Data

Jun. 26, 2001 (FR) ................................. 01 08393

(51) Int. Cl.
*F16G 1/28* (2006.01)
(52) U.S. Cl. .................. 474/202; 474/153; 474/251
(58) Field of Classification Search .................. 74/89, 74/89.2, 89.21, 89.22, 22; 474/152, 156, 474/206, 153, 251, 202; 52/108, 118; 254/DIG. 1; 198/626.1, 626.2, 626.3, 626.4, 626.5, 626.6
See application file for complete search history.

(56) References Cited

U.S. PATENT DOCUMENTS

| | | | | |
|---|---|---|---|---|
| 2,375,461 A | * | 5/1945 | Bender | 52/108 |
| 2,554,300 A | * | 5/1951 | Yaichi | 52/108 |
| 2,987,932 A | * | 6/1961 | Szonn | 474/153 |
| 3,012,635 A | * | 12/1961 | Blain | 187/250 |
| 3,587,216 A | * | 6/1971 | Camarillo et al. | 56/327.1 |
| 3,645,146 A | * | 2/1972 | Nagin | 74/89.21 |
| 3,792,952 A | * | 2/1974 | Hamon | 425/343 |
| 4,634,410 A | * | 1/1987 | Tangorra et al. | 474/153 |
| 4,726,247 A | * | 2/1988 | Hormann | 74/424.6 |
| 5,303,817 A | * | 4/1994 | Kissee | 198/833 |
| 5,347,770 A | * | 9/1994 | McDonnell et al. | 52/108 |
| 5,355,643 A | * | 10/1994 | Bringolf | 52/108 |
| 5,803,418 A | * | 9/1998 | Bringolf et al. | 248/158 |
| 6,419,603 B1 | * | 7/2002 | Grasl | 474/202 |
| 2002/0142875 A1 | * | 10/2002 | Rosenberger | 474/237 |

FOREIGN PATENT DOCUMENTS

| | | |
|---|---|---|
| EP | 0 799 788 A1 | 10/1997 |
| EP | 799788 A1 * | 10/1997 |
| JP | 52037668 | 3/1977 |
| WO | WO98/46903 | 10/1998 |

* cited by examiner

*Primary Examiner*—Richard Ridley
*Assistant Examiner*—Matthew A. Johnson
(74) *Attorney, Agent, or Firm*—Baker & Daniels LLP

(57) ABSTRACT a linear actuator capable of transmitting tractive forces as well as thrust forces and operating then as a rigid single-piece rod. The linear actuator has two identical actuating belts (1, 1') with notches on each of their sides (10, 10'; 11, 11') and provided on one first side (10, 10') with uniformly spaced blocks (2, 2') which mesh with drive members (3) such that the two actuating belts (1, 1') are independent upstream of the drive members (3), whereas downstream of the drive members, they are integrally assembled so as to define a section extending along a straight line wherein the linear actuator operates like a single-piece rigid rod.

8 Claims, 5 Drawing Sheets

LINEAR BELT ACTUATOR

Figure 1:
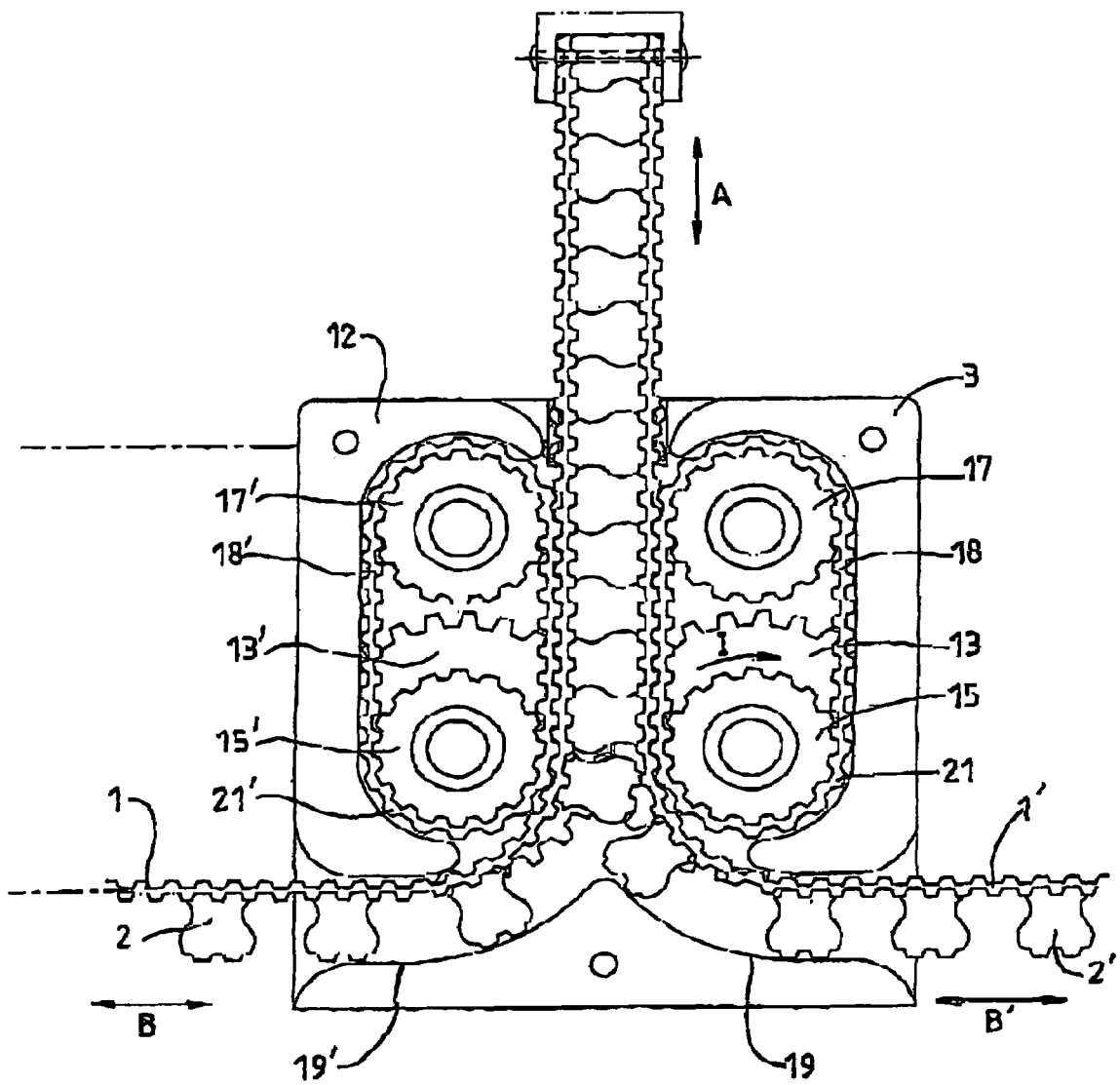

The present invention relates to a linear actuator which can transmit tractive forces and also thrust forces, in that case behaving as a unitary rigid bar Thrust chains suitable for performing this function have already been proposed. Thrust chains of this type have already been described, for example, in the documents FR-1 297 285 and FR-2 061 884.

These chains are conventionally constituted by a series of links articulated to one another by means of pins that are arranged transversely.

Each link comprises two substantially parallel flanges which are pierced, respectively, by two holes for receiving the articulation pins and each of which is equipped with an extension defining a front transverse active face and a rear transverse active face which are caused to bear against the rear and front transverse active faces, respectively, of the flanges of the adjacent links when the portion of chain of which the links in question form part extends along a straight line.

Thrust chains of this type are driven, in the region of a curved end, by a device comprising a casing, a rotary pinion which has its axis parallel to the articulation pins of the links and is mounted in the casing and on which the chain is wound, as well as idle rollers for guiding the links of the chain around the rotary pinion.

Thrust chains of this type can transmit tractive and thrust forces in a satisfactory manner in any direction, including upwards, but have a fundamentally sophisticated configuration.

Moreover, these thrust chains are suitable purely for actuating "heavy" mechanical parts and, up to now, a similar device which is designed to enable changes in direction to be performed in small automatic mechanisms has never been proposed.

The object of the present invention is to fill this gap by proposing a linear actuator of the above-mentioned type which is characterized in that it comprises two identical actuating bolts which are toothed on each of their faces and are provided, on a first of their faces, with uniformly-spaced studs which mesh by means of drive members in a manner such that the two actuating belts are independent upstream of the drive members whereas, downstream of those members, they are assembled integrally so as to define a portion which extends along a straight line and in which the linear actuator behaves as a unitary rigid bar.

These actuating belts are preferably made of a flexible, reinforced plastics material and thus correspond to simple and inexpensive elements also having the advantage that they can be manufactured by moulding in a single piece.

According to a preferred characteristic of the invention, the drive members are constituted by a casing enclosing two rotary pinions, that is, a drive pinion and a driven pinion, which engage one another and drive two endless caterpillar-type bands mounted on one side and on the other side of the actuating belts, respectively, and equipped on their outer faces with teeth which cooperate with the teeth situated on the second faces of those belts and are fitted between those teeth so as to translate the belts whilst squeezing them against one another so that their facing studs engage one another.

According to the invention, the casing of the drive members also contains guide surfaces for the actuating belts, which guide surfaces are designed to enable the belts to bend in the region of the endless caterpillar-type bands in order to cause them to face one another so that their respective studs can engage one another.

According to another characteristic of the invention, the studs of the actuating belts comprise two side faces as well as a front transverse active face and a rear transverse active face each having a double curvature.

The front and rear transverse active faces of a stud of one of the actuating belts are caused to bear against the respective rear and front transverse active faces, respectively, of two associated adjacent studs of the other actuating belt when the two actuating belts are assembled integrally.

It is essential, in order for the linear actuator according to the invention to be able to perform its function, that the linear portion defined by the two actuating belts when they are assembled integrally should not include "voids" and, therefore, that the geometry of the actuating belts should be such that the shape and dimensions of the spaces between the studs should be identical to those of the studs.

According to another characteristic of the invention, the front and rear transverse active faces of the studs comprise a double shoulder forming an abutment.

These shoulders prevent any transverse sliding of the adjacent studs relative to one another when the two actuating belts are assembled integrally.

According to another characteristic of the invention, the front and rear transverse active faces of the studs are separated by a substantially rectilinear, toothed longitudinal face.

The teeth of the longitudinal face of a stud of one of the belts are caused to cooperate with corresponding teeth of the section of the first face of the other belt situated between the two studs associated with that stud, whilst being fitted between those teeth, when the two actuating belts are assembled integrally.

As a result, in this position, the faring first faces of the two actuating belts are intimately engaged over their entire length.

According to another characteristic of the invention, the two rotary pinions are extended coaxially by respective toothed extensions of smaller diameter cooperating with respective idle auxiliary gears of the same diameter so as to drive the endless caterpillar-type bands.

According to the invention, the casing of the drive members may also advantageously contain at least a pair of positioning rollers having axes substantially perpendicular to the axes of the rotary pinions and engaging on one side and on the other side of a linear portion of the actuator defined by the two integrally assembled actuating belts, against the side faces of the studs of those belts.

Figures 2, 2A:
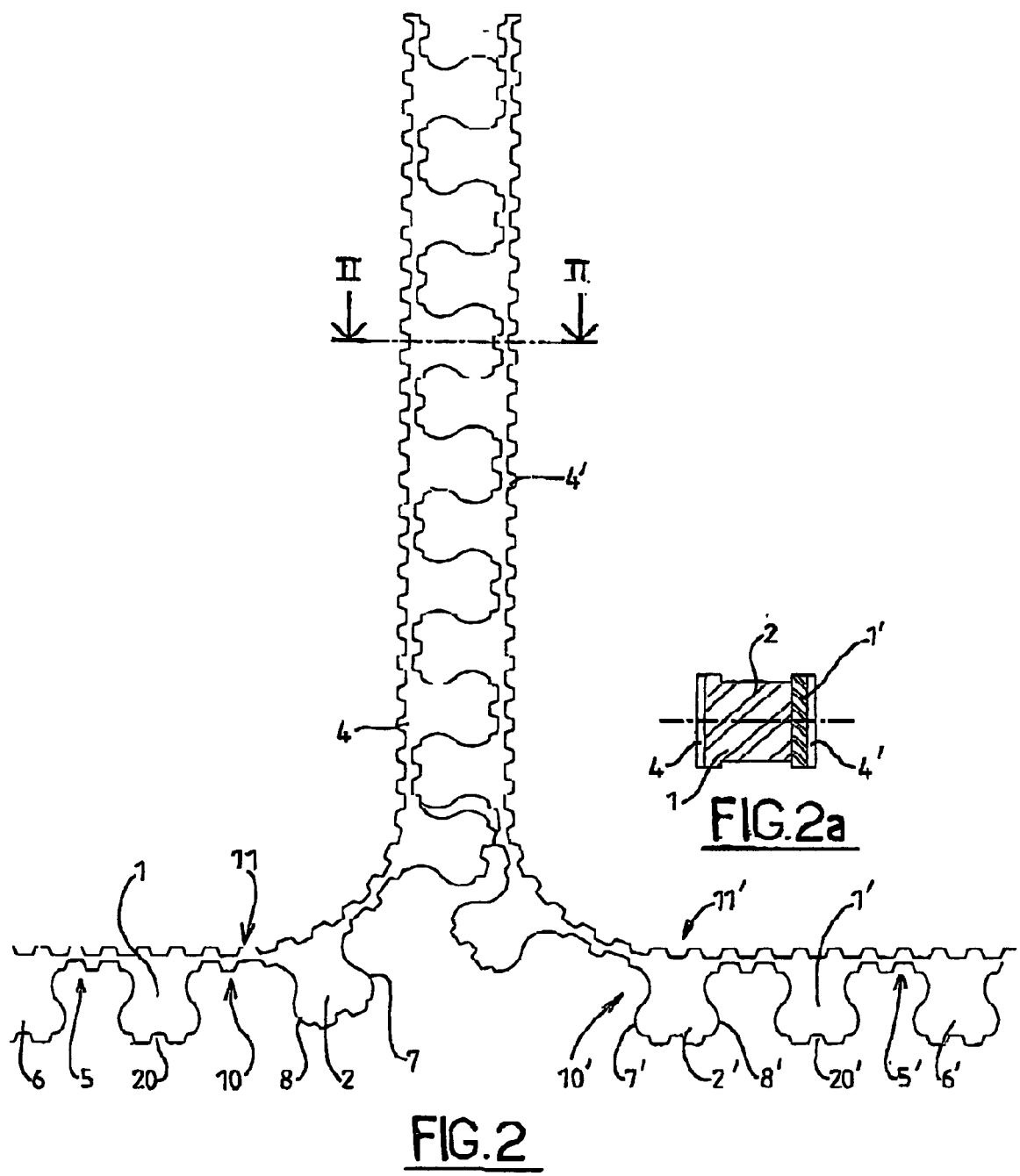
Figure 3:
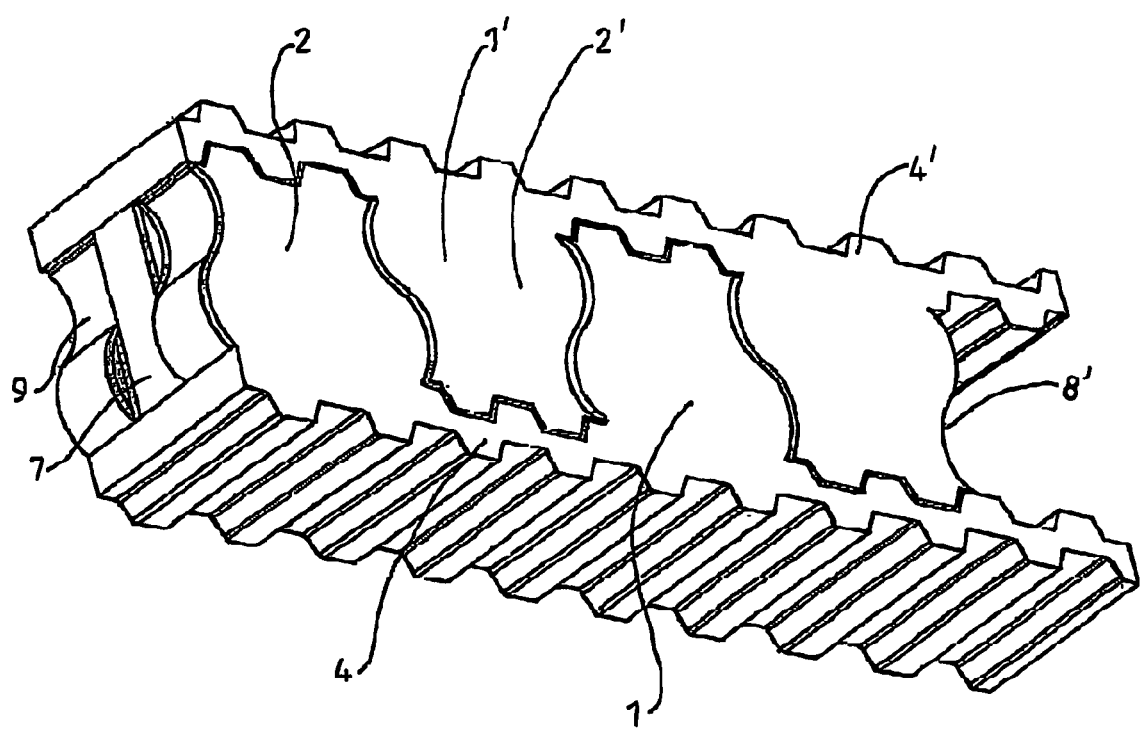
Figure 4:
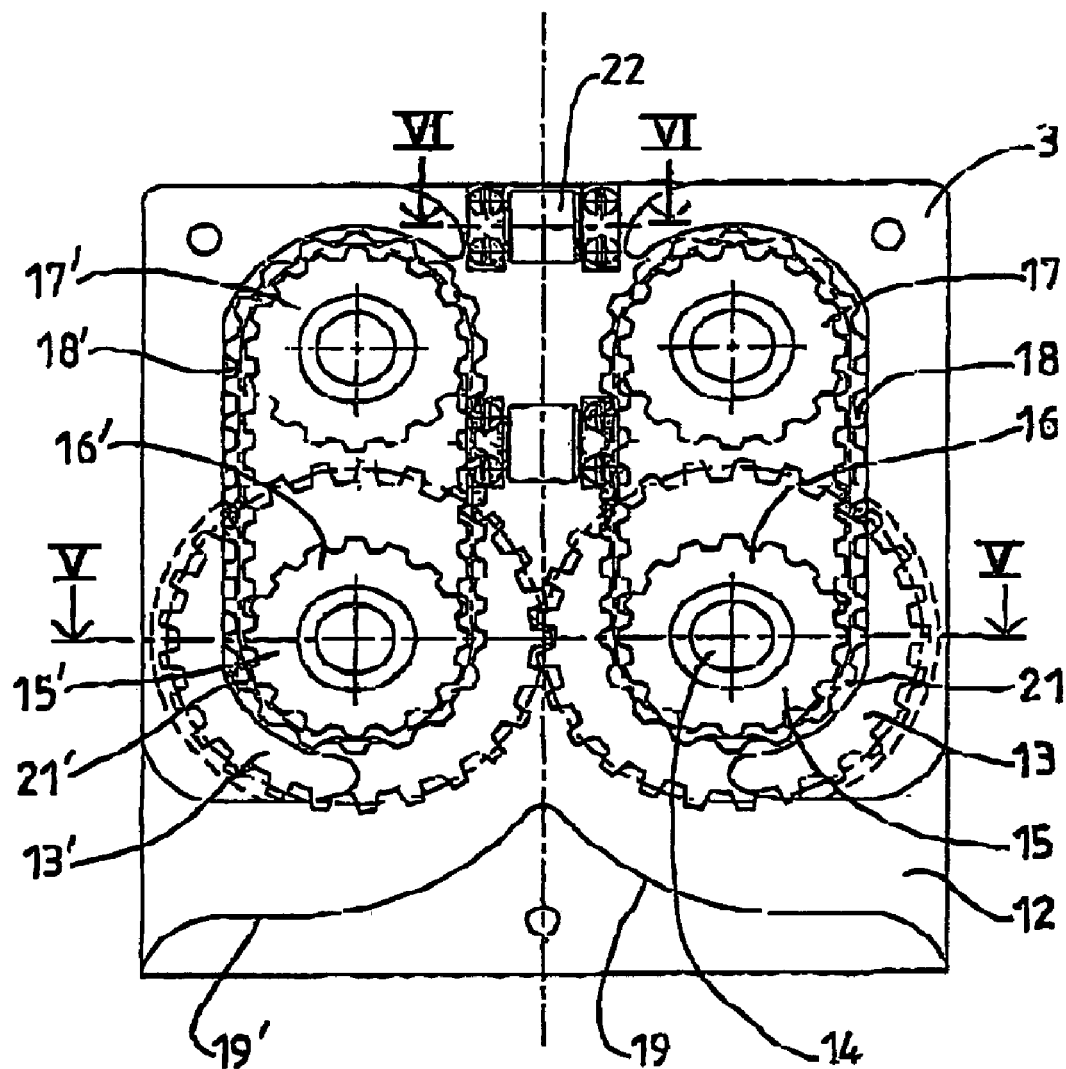
Figure 5:
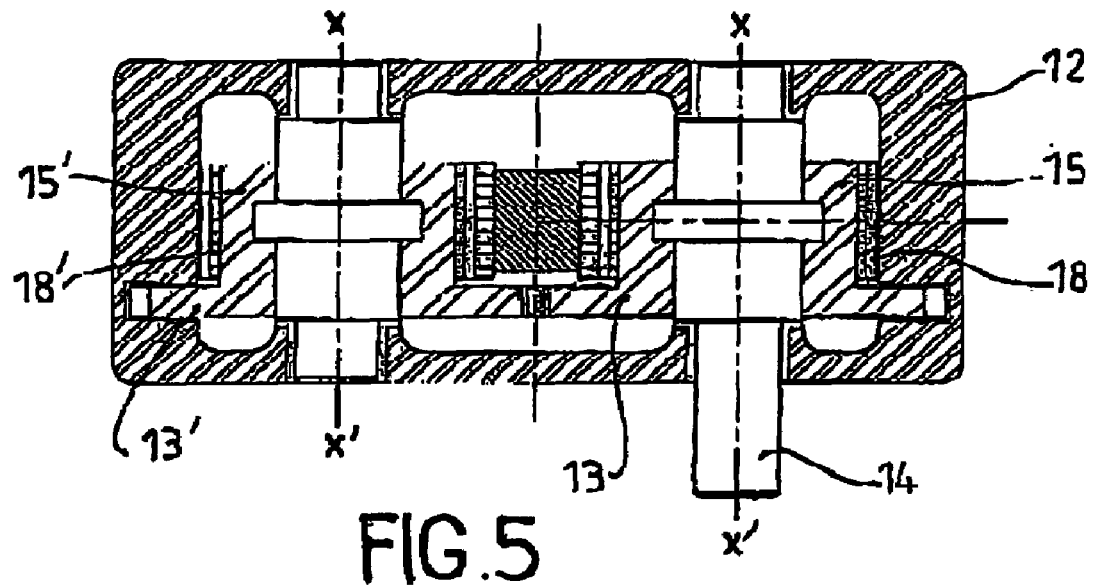
Figure 6:
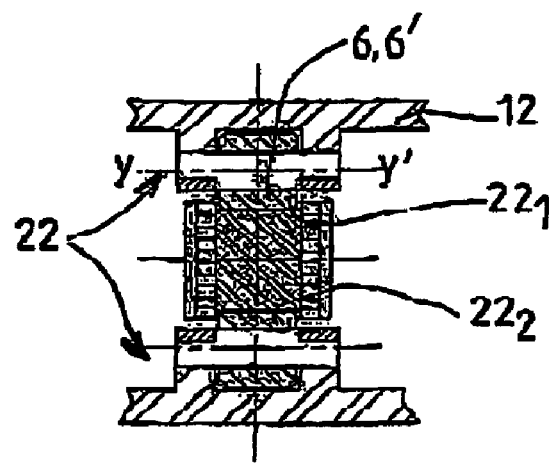

The characteristics of the linear actuator of the invention will be described in greater detail with reference to the appended drawings, in which:

FIG. 1 is a diagram showing the linear actuator, in which the upper portion of the casing of the drive members has been removed, FIG. 2 shows the two actuating belts, FIG. 2a is a section through FIG. 2, taken in a plane indicated schematically by the axis II-II, FIG. 3 shows a detail of the two actuating belts, FIG. 4 is a diagram showing the drive members, in which the upper portion of the casing of these members has been removed, FIG. 5 is a section through FIG. 4, taken in a plane indicated schematically by the axis V V, the actuating belts being positioned in the drive members, FIG. 6 is a section through FIG. 4 taken in a plane indicated schematically by the axis VI VI, the actuating belts being positioned in the drive members.

According to FIG. 1, the linear actuator comprises two identical actuating belts 1, 1' as well as drive members 3 which drive the actuating belts 1, 1' so as to translate them in one direction or in the other in accordance with the double arrows A, B and B'.

In the lower portion of FIG. 1, that is, upstream of the drive members 3, the two actuating belts 1, 1' are independent of one another whereas, in the upper portion of FIG. 1, that is, downstream of the drive members 3, the two belts 1, 1' are assembled integrally so as to define a portion which extends along a straight line and in which the linear actuator behaves as a unitary rigid bar.

According to FIGS. 2, 2a and 3, the actuating belts 1, 1' are provided on each of their races 10, 11 and 10', 11' with identical teeth 4, 4' which are caused, respectively, to fit between associated teeth in a manner which will be described in greater detail below.

A first face 10, 10' of the actuating belts 1 is also equipped with uniformly-spaced studs 2, 2' which are separated by toothed sections 5, 5'.

Each stud 2, 2' comprises two side faces 6, 6' as well as a front transverse active face 7, 7' and a rear transverse active face 8, 8' having a double curvature.

The front and rear transverse active faces 7, 7', 8, 8' of the studs 2, 2' are separated by a substantially rectilinear toothed longitudinal face 20, 20'.

As can be seen in particular in FIG. 3, the actuating belts 1, 1' have a geometry which is designed in a manner such that the shape and dimensions of the spaces between the studs 2, 2' are identical to those of the studs.

According to FIG. 3, the front and rear transverse active faces 7,7', 8,8' of the studs 2,2' also comprise a double shoulder 9 forming an abutment the function of which will also be explained below.

According to FIGS. 4, 5 and 6, the drive members 3 comprise a casing 12 containing two rotary pinions 13, 13' of the same diameter and of axis X-X', which engage one another.

According to FIG. 5, one of these pinions 13 is a drive pinion and is connected to a motor, not shown, by a drive axle 14 projecting from the casing 12, whereas the second rotary pinion 13' is a driven pinion.

According to FIGS. 4 and 5, the rotary pinions 13, 13' are extended coaxially by respective extensions 15, 15' equipped with teeth 16, 16' and having a smaller diameter.

According to FIG. 4, the toothed extensions 15, 15' cooperate, respectively, with two idle auxiliary gears 17, 17' of the same diameter and with parallel axes.

The rotary pinions 13, 13' equipped with the toothed extensions 15, 15' and the auxiliary gears 17, 17' also rotate two endless caterpillar-type bands 18, 18' the inner faces of which art equipped, for this purpose, with teeth corresponding to the teeth of the extensions 15, 15' and of the auxiliary gears 17, 17'.

These two endless bands 18, 18' are caused to sandwich the two actuating bolts 1, 1' between them in order to guide the belts and translate them in one direction or in the other, according to the direction of rotation of the drive pinion 13.

For this purpose, the outer faces of the two caterpillar-type endless bands 18, 18' also have teeth 21, 21' which can engage the teeth 4, 4' situated on the second faces 11, 11' of the two actuating belts 1, 1' in order to translate the belts in accordance with the arrows A, B and B'.

According to FIGS. 1 and 4, the casing 12 of the drive members 3 also contains guide surfaces 19, 19' for the two actuating belts 1, 1'; the guide surfaces 19, 19' cooperate with the longitudinal faces 20, 20' of the studs 2, 2' of the belts in order to transfer the belts between the endless caterpillar-type bands 18, 18' or to disengage them therefrom, by bending them.

According to FIG. 1, in the course of this transfer, when the drive pinion 13 turns clockwise, the studs 2, 2' of the two actuating belts 1, 1' enter the casing 12 independently in the region of its side edges, on one side and on the other side of the casing, and are then guided so as to translate in its inner portion along the guide surfaces 19, 19', respectively, in the region of which guide surfaces 19, 19' the belts are subjected to bending such that they are situated facing one another before entering between the two endless caterpillar-type bands 18, 18'.

In the region of these bands, the actuating belts 1, 1' are squeezed against one another so that the studs 2, 2' mesh with one another and the two belts 1, 1' are assembled integrally in a portion extending along a straight line.

For this purpose, the front and rear transverse active faces 7, 7', 8, 8' of the studs 2, 2' of one of the actuating belts 1, 1' bear, respectively, against the rear and front transverse active faces 8', 8, 7', 7 of the two associated adjacent studs 2', 2 of the other actuating belt 1', 1' and the teeth 4, 4' of the longitudinal faces 20, 20' of the studs 2, 2' of one of the actuating belts 1, 1' engage, respectively, in the corresponding teeth of the respective section 5' 5 of the other actuating belt 1', 1 separating the two associated adjacent studs 2', 2, so that the two actuating belts are fitted together perfectly to define a unitary rigid bar.

In this position, the double abutment shoulders 9 provided on the transverse active faces 7, 7'; 8, 8' prevent any transverse sliding of the adjacent studs 2, 2' relative to one another.

Naturally, when the drive pinion 13 turns anticlockwise, the displacement of the studs 2, 2' of the two actuating belts 1, 1' takes place in the opposite direction, that is, the studs enter the casing 12 fitted together and are separated at the level of the two caterpillar-type endless bands 18, 18'.

Moreover, and according to FIGS. 4 and 6, the casing 12 also encloses two pairs of positioning rollers 22.

Each of these pairs is constituted by a combination of two positioning rollers $22_1$, $22_2$ of axis Y-Y' perpendicular to the axes X-X' of the rotary pinions 13, 13'.

These positioning rollers $22_1$, $22_2$ engage against the side faces 6, 6' of the studs 2, 2' in order to ensure the correct positioning of the actuating belts 1, 1' when they are fitted together.

The invention claimed is:

1. A linear actuator for transmitting tractive and thrust forces, said actuator comprising:

first and second flexible actuating belts, each said actuating belts having an inner face and an outer face, each said inner faces including a plurality of spaced apart studs disposed thereon, said studs spaced apart by spaces of equal length, a first tooth disposed on said inner faces in each said spaces of both said actuating belts, each said space associated with each said belt shaped to form fittingly receive therein a said stud disposed on the other said actuating belt to thereby completely fill said space, each said studs including first and second side faces, a front active face, a rear active face, and a substantially rectilinear face between said front active face and said rear active face, each said rectilinear face having a second tooth disposed thereon, said outer faces of said actuating belts each having a plurality of third teeth disposed thereon;

a control member operatively associated with said first and second belts to cause the plurality of studs disposed on said first and second belts to mesh with one another, said control member comprising a pair of toothed members, each said toothed member having a plurality of fourth teeth operatively arranged to mesh with said plurality of third teeth, so that when said first and second teeth are caused to mesh by said control member, said studs of said respective first and second belts are each form fittingly received in said spaces of said respective second and first belts, each of said plurality of said first teeth of said respective first and second belts are engaged with said second tooth associated with said respective second and first belts, and said plurality of third teeth of said respective first and second belts are each engaged with said plurality of fourth teeth of one of said toothed members, wherein said meshed belts are independent upstream of said control member and form a unitary rigid member downstream of said control element without voids between said studs.

2. The linear actuator of claim 1 wherein said first and second actuating belts are comprised of a reinforced plastic material.

3. The linear actuator of claim 1 wherein said first teeth, said second teeth, and said third teeth are identical in shape.

4. The linear actuator of claim 1 wherein each said front and said rear active faces are S shaped.

5. The linear actuator of claim 1 wherein each said front and said rear active faces include a double shoulder to thereby prevent said meshing studs from transversely sliding relative to one another downstream of said control element.

6. The linear actuator of claim 1 wherein said toothed members comprise two endless belts, each said endless belts having first and second sides, said fourth teeth located on a first side of each said respective endless belts, said control member further comprising a rotatable driving pinion and a rotatable driven pinion, said driving pinion drivingly engaging said driven pinion and said two endless belts.

7. The linear actuator of claim 6 wherein each said driving and driven pinions include a toothed extension, said control member further including two auxiliary idler gears, said respective toothed extensions and auxiliary idler gears directly engaging said respective endless belts.

8. The linear actuator of claim 6 wherein said control member further includes a plurality of positioning rollers for engaging said side faces.

* * * * *